E. RUEGGER.
THRUST BEARING.
APPLICATION FILED MAY 26, 1913.
1,131,739.
Patented Mar. 16, 1915.
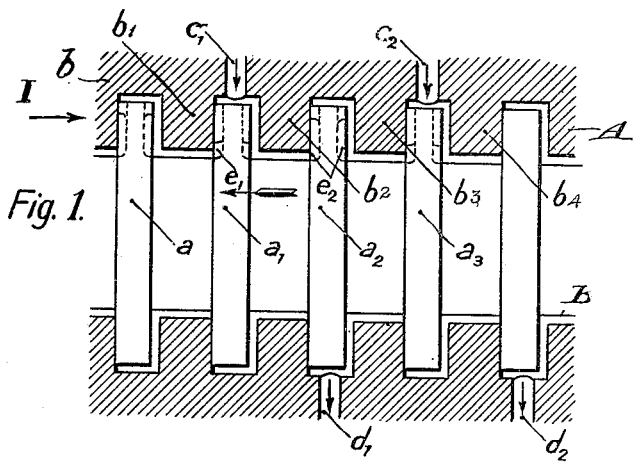
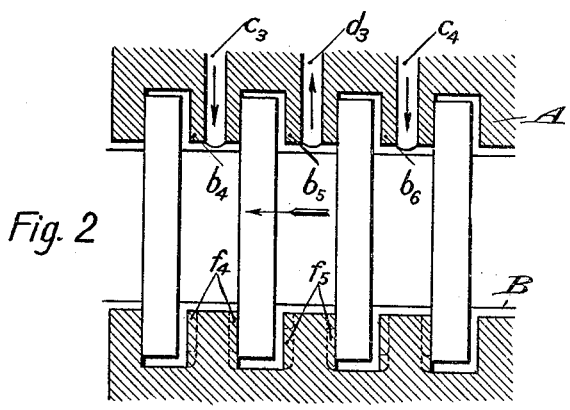
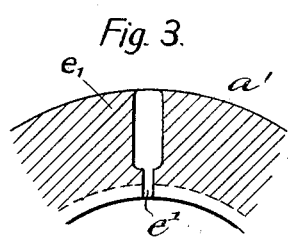
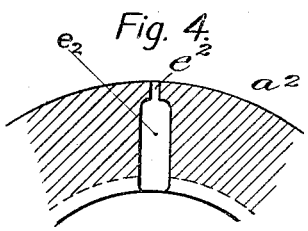
Witnesses:
B. Dommers
E. Leckert
Inventor:
Eduard Ruegger,
By
Atty

UNITED STATES PATENT OFFICE.

EDUARD RUEGGER, OF ZURICH, SWITZERLAND, ASSIGNOR TO THE FIRM OF AKTIEN-GESELLSCHAFT DER MASCHINENFABRIKEN ESCHER, WYSS & CIE., OF ZURICH, SWITZERLAND.

THRUST-BEARING.

1,131,739.  Specification of Letters Patent.  Patented Mar. 16, 1915.

Application filed May 26, 1913. Serial No. 769,952.

*To all whom it may concern:*

Be it known that I, EDUARD RUEGGER, a citizen of the Republic of Switzerland, residing at Zurich, Switzerland, have invented new and useful Improvements in Thrust-Bearings; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to the forced oil lubrication of the thrust-bearings.

The characteristic feature of the invention consists in that the oil under pressure is fed into the bearing either near each second revolving collar or near each second stationary collar and that it escapes near each intermediate rotating collar or near each intermediate stationary collar respectively. In this manner the oil can only escape from the thrust-bearing by passing between the frictional surfaces under pressure. This is not the case in thrust-bearings already known.

In the accompanying drawing: Figure 1 is a side view partly in section of one form of thrust-bearing embodying my invention. Fig. 2 is a like view of a modified form. Figs. 3 and 4 are detail sectional views of the rotatable collars showing the different forms of lubricating grooves.

Oil under pressure is fed into grooves $c_1$ and $c_2$ provided in the bearing shell A to the rotating collars $a$, $a_1$, $a_2$, and $a_3$, of the shaft B. It is assumed that the shaft and its collars are pressed from right to left against the stationary collars $b$, $b_1$, $b_2$, $b_3$, $b_4$. The oil flowing through the groove $c_1$ for example flows in two branches, one of which serves to lubricate the part subjected to friction between the rotating collar $a_1$ and the stationary collar $b_1$. In order to facilitate the lubrication of this part the collar $a_1$ is provided with suitably arranged oil grooves $e_1$ extending across the greater part of the surfaces subjected to friction, said groove having a contracted outlet $e'$ near the shaft B to throttle the oil as shown in Fig. 3. The other part of the oil flows through the small space provided between the rotating collar $a_1$, and the stationary collar $b_2$, then along the shaft toward the right hand side, and is positively forced against the bearing surface between the rotating collar $a_2$ and the stationary collar $b_2$. Also on this side the flow of the oil is facilitated by means of lubricating grooves $e_2$ similar to the above described grooves $e_1$. These grooves $e_2$ begin however on the inner side of the collar $a_2$ and leave only a small throttle passage $e_2$ on the outside of the collar.

Fig. 3 shows a part of the collar $a_1$ with the groove $c_1$ looking in the direction of the arrow I, Fig. 1. Fig. 4 shows a part of the collar $a_2$ with the groove $e_2$ also looking in direction of the arrow I. Owing to the fact, that the oil under pressure flows in these grooves, which must however not permit an entirely unhindered flow of the oil but have to be provided with the above mentioned throttle passage, a very valuable reacting force acting upon the bearing surfaces is obtained, so that the flow of the oil is facilitated. In a similar manner the oil under pressure fed to the groove $c_2$ is distributed over two branches. The oil passing through the space between the rotating collar $a^3$ and the stationary collar $b_3$ mixes in the annular space surrounding the rotating collar $a_2$ with the oil fed through the groove $c_1$ to the collar $a_2$ and then all the oil flows off through the groove $d_1$. It is evident, that it is also possible to provide similar lubricating grooves in the stationary collars. Fig. 2 shows such grooves $f_4$, $f_5$ in the stationary collars $b_4$ and $b_5$ respectively.

Fig. 2 shows how the feeding grooves $c_3$ and $c_4$ are arranged in the stationary collars $b_4$ and $b_6$. The escape groove $d_3$ is provided between the two grooves $c_3$ and $c_4$ and it is also arranged in a stationary collar, viz. $b_5$. By this arrangement the oil flowing through the grooves $c_3$ and $c_4$ is forced to pass between the thrust surfaces, before being able to escape through the groove $d_3$. The two constructions shown in the drawing represent parts cut out from a thrust bearing. The disks and collars, the bearing shell and the grooves may have any suitable form.

I claim:

1. In a thrust bearing, the combination with a shaft having spaced thrust collars thereon, a stationary bearing shell having spaced thrust collars coöperating with those on the shaft, and oil distributing grooves in the faces of one set of collars, of means to supply oil to alternate pairs of coacting collar faces and means to withdraw said oil past the faces of an adjacent pair of collars alternating with the aforementioned pairs of faces.

2. In a thrust bearing, the combination with a shaft having collars thereon, and a stationary shell also having collars thereon coöperating with the collars on the shaft, of means to supply oil under pressure to a chamber bounded by pairs of coöperating bearing collar faces and from which oil may pass over either or both faces to a chamber bounded by adjacent pairs of coöperating bearing collar faces.

3. In a thrust bearing, the combination with a shaft having spaced thrust collars thereon and a stationary bearing shell having thrust collars alternating with the collars on the shaft, of means for forcing oil into the chamber formed between two stationary bearing collar faces constituting a high pressure chamber, and means for discharging oil from the next adjacent chamber formed between two stationary bearing collar surfaces and constituting a low pressure chamber whereby oil entering the high pressure chamber will leave the adjacent low pressure chamber without passing through any other chamber.

4. In a thrust bearing, the combination with a shaft having collars thereon, and a bearing shell having stationary collars coöperating with those on the shaft, of oil grooves in one of the coacting faces of a pair of collars and having a contracted throttled exit end.

5. In a thrust bearing, the combination with a shaft having collars thereon and a bearing shell having stationary collars coöperating with those on the shaft, of radial oil grooves in one of the coacting faces of a pair of collars and having a throttled exit and means to supply oil to a chamber included between two stationary bearing collar faces and constituting a high pressure chamber with which said grooves communicate, and means to discharge oil from an adjacent like chamber constituting a low pressure chamber into which said grooves discharge.

6. In a thrust bearing, the combination with a shaft having collars thereon and a bearing shell having stationary collars coöperating with those on the shaft, of radial oil grooves in both side faces of the shaft collars having a throttled exit and means to supply oil to a chamber included between two stationary bearing collar faces and constituting a high pressure chamber with which said grooves communicate, and means to discharge oil from an adjacent like chamber constituting a low pressure chamber into which said grooves discharge.

In testimony that I claim the foregoing as my invention, I have signed my name in presence of two subscribing witnesses.

EDUARD RUEGGER.

Witnesses:
CARL GERARD,
ARNOLD LEHNER.

Copies of this patent may be obtained for five cents each, by addressing the "Commissioner of Patents, Washington, D. C."